US005264275A

United States Patent [19]

Misuda et al.

[11] Patent Number: 5,264,275

[45] Date of Patent: Nov. 23, 1993

[54] RECORDING SHEET FOR AN INK JET PRINTER

[75] Inventors: Katsutoshi Misuda; Shinichi Suzuki; Takahumi Hasegawa; Hitoshi Kijimuta, all of Yokohama, Japan

[73] Assignee: Asahi Glass Company Ltd., Tokyo, Japan

[21] Appl. No.: 918,026

[22] Filed: Jul. 24, 1992

[30] Foreign Application Priority Data

Jul. 26, 1991 [JP] Japan ................................ 3-209890
Apr. 8, 1992 [JP] Japan ................................ 4-115469

[51] Int. Cl.$^5$ ................................ B32B 9/00

[52] U.S. Cl. ................................ 428/304.4; 428/195; 428/480; 428/650; 428/688; 428/914

[58] Field of Search .................... 428/304.4, 195, 331, 428/336, 454, 520, 914, 480, 650, 688; 346/135.1

[56] References Cited

U.S. PATENT DOCUMENTS 5,104,730 4/1992 Misuda et al. .................... 428/195

FOREIGN PATENT DOCUMENTS 0298424 1/1989 European Pat. Off. .
0407720 1/1991 European Pat. Off. .
0450540 10/1991 European Pat. Off. .
2-276670 11/1990 Japan .

*Primary Examiner*—Patrick J. Ryan
*Assistant Examiner*—W. Krynski
*Attorney, Agent, or Firm*—Oblon, Spivak, McClelland, Maier & Neustadt

[57] ABSTRACT

A recording sheet for an ink jet printer, which comprises a substrate, a lower layer of porous pseudo-boehmite having an average pore radius of from 20 to 80 Å formed in a thickness of from 5 to 60 μm on the substrate and an upper layer of porous pseudo-boehmite having an average pore radius of from 40 to 150 Å formed in a thickness of from 2 to 30 μm on the lower layer, the average pore radius of the upper layer being larger than that of the lower layer.

9 Claims, No Drawings

RECORDING SHEET FOR AN INK JET PRINTER

The present invention relates to a recording sheet for an ink jet printer.

In recent years, it has become common to employ an overhead projector (hereinafter referred to simply as OHP) instead of a conventional slide projector for presentation at various meetings or seminars. For printing or marking on transparent sheets for an overhead projector, a special care is required with respect to the printing speed or drying as compared with printing on ordinary paper sheets, since the transparent sheets do not have absorptivity by themselves.

To prepare a very small amount of printed matters such as sheets for OHP, it is common to employ a method wherein a copy is prepared by means of a personal computer or a word processor, and it is printed by means of a printer. As the printer, an ink jet system has attracted an attention, since full color printing is thereby easy, and the printing noise is thereby low.

An OHP sheet for an ink jet printer is required to have transparency and an ink absorptivity. The present inventors have proposed a recording sheet suitable as a recording material for an ink jet printer, which is provided with both the transparency and the ink absorptivity, for example, in Japanese Unexamined Patent Publication No. 276670/1990.

In the ink jet system, ink droplets are ejected from a nozzle at a high speed towards a recording material, and the ink contains a large amount of solvent in order to prevent clogging of the nozzle. To obtain a high color density, it is necessary to use a large amount of ink, and the recording material is required to readily absorb the ink and yet required to have a high level of absorptivity with an excellent color forming property.

In the ink jet system, one ink droplet ejected from the nozzle forms one dot of the printed image. If absorption of the ink is not swift, droplets are likely to join to one another on the surface of the recording material, whereby dots are likely to deform, and ink droplets are likely to contact the sheet-transporting means or the like, whereby the printed image may be smeared or the ink may run.

It is an object of the present invention to provide a recording sheet for an ink jet printer, which has high transparency and which is capable of readily absorbing ink droplets and presenting an image free from joining of dots, or blotting or smear.

The present invention provides a recording sheet for an ink jet printer, which comprises a substrate, a lower layer of porous pseudo-boehmite having an average pore radius of from 20 to 80 Å formed in a thickness of from 5 to 60 μm on the substrate and an upper layer of porous pseudo-boehmite having an average pore radius of from 40 to 150 Å formed in a thickness of from 2 to 30 μm on the lower layer, the average pore radius of the upper layer being larger than that of the lower layer.

Now, the present invention will be described in detail with reference to the preferred embodiments.

On the substrate, a layer of porous pseudo-boehmite having an average pore radius of from 20 to 80 Å is formed. If the average pore radius of this layer is less than 20 Å, no adequate absorptivity for the dye in the ink will be obtained, such being undesirable. On the other hand, if the average pore radius exceeds 80 Å, the transparency of the recording sheet is likely to be impaired. The thickness of this layer is from 5 to 60 μm. If the thickness of this layer is less than 5 μm, no adequate absorptivity of the dye will be obtained, such being undesirable. On the other hand, if the thickness of this layer exceeds 60 μm, the transparency of the recording sheet is likely to be impaired, or the mechanical strength of the layer tends to be low, such being undesirable.

In the present invention, a porous pseudo-boehmite layer having an average pore radius of from 40 to 150 Å, is formed as an upper layer, whereby when the ink is ejected from the nozzle of the ink jet printer in the form of droplets, it is possible to readily absorb the ink droplets. This layer is required to have a thickness of from 2 to 30 μm. If the thickness of this layer is less than 2 μm, the effect of the present invention can not be obtained, and the ink-absorbing rate will not adequately increase. On the other hand, if the thickness of this layer exceeds 30 μm, no further increase in the effects for increasing the ink-absorbing rate will be obtained, and the transparency of the recording sheet is likely to be impaired.

The upper layer of pseudo-boehmite is required to have an average pore radius larger than the lower layer of pseudo-boehmite. It is preferred that the difference in the average pore radius is not less than 2 Å. In the present invention, the pore size distribution is measured by a nitrogen adsorption and desorption method.

Especially when the lower layer has an average pore radius of from 40 to 60 Å and a thickness of from 30 to 50 μm, and the upper layer has an average pore radius of from 50 to 70 Å and a thickness of from 5 to 10 μm, it is possible to obtain a recording sheet having a good ink-absorbing property and being excellent in the transparency, such being desirable.

Further, both the upper and lower layers of pseudo-boehmite preferably have a pore volume of from 0.3 to 1.0 cc/g from the viewpoint of the ink absorptivity.

In the present invention, pseudo-boehmite is a xerogel of boehmite represented by the chemical formula AlOOH. Here, the pore characteristics when gelled vary depending upon the size and the shape of colloid particles of boehmite. If boehmite having a large particle size is employed, pseudo-boehmite having a large average pore radius can be obtained.

Further, when a binder is employed to impart mechanical strength to the porous layers, the pore characteristics also vary depending upon the type and amount of the binder. In general, the larger the amount of the binder, the smaller the average pore radius.

As the binder, it is usually possible to employ an organic material such as starch or its modified products, polyvinyl alcohol or its modified products, SBR latex, NBR latex, carboxymethyl cellulose, hydroxymethyl cellulose or polyvinyl pyrrolidone. The binder is used preferably in an amount of from 5 to 50% by weight of the pseudo-boehmite. If the amount of binder is less than 5% by weight, the strength of the alumina hydrate layer tends to be inadequate. On the other hand, if it exceeds 50% by weight, the colorant-adsorbing properties tend to be inadequate.

In the present invention, the substrate is not particularly limited, and various substrates may be employed. Specifically, various plastics including a polyester-type resin such as polyethylene terephthalate and polyester diacetate, a polycarbonate-type resin, and a fluorine-type resin such as ETFE, or various glass materials, are preferably employed. When the substrate of the present invention is transparent, a transparent recording sheet can be obtained, and it is useful for OHP sheet. Further, for the purpose of improving the adhesive strength of an aluminahydrate layer, corona discharge treatment or under-coating, may be applied.

As a method for forming a pseudo-boehmite layer on the substrate, it is possible to employ, for example, a method wherein a binder is added to a boehmite sol to obtain a slurry, and the slurry is coated by means of a roll coater, an air knife coater, a blade coater, a rod coater, a bar coater or a comma coater, followed by drying. By this method, firstly, the lower layer is formed on the substrate, and preferably after the binder is sufficiently cured, the upper layer is formed.

In the present invention, it is preferred to form a swellable polymer layer on the side of the substrate opposite to the side on which the porous pseudo-boehmite layers are formed, since it is thereby possible to suppress warping of the porous pseudo-boehmite layers due to adsorption and desorption of the moisture.

In the present invention, the polymer layer having a swellable nature, expands or shrinks upon adsorption or desorption of moisture in the air in the same manner as the pseudo-boehmite layers. Accordingly, when the sheet is placed on an OHP projector and heated so that the moisture in the pseudo-boehmite layers is discharged and the pseudo-boehmite layers undergo shrinkage, the polymer layer on the other side shrinks likewise, whereby warping of the sheet can be suppressed.

As the material for the polymer layer, polyvinyl alcohol (hereinafter referred to simply as PVA), polyvinyl pyrrolidone (hereinafter referred to simply as PVP) or their blend is preferred. Especially preferred is a blend of PVA and PVP in a weight ratio of from 4:6 to 9:1. If the weight ratio of PVP exceeds this range, the water resistance of the polymer layer tends to be inadequate. On the other hand, if it is less than the above range, no adequate effects for suppressing warping of the sheet tend to be obtained.

As other preferred materials for the polymer layer, organic materials including starch or a modified product of PVA, SRB latex, NBR latex, carboxymethyl cellulose and hydroxymethyl cellulose may be employed.

The thickness of the polymer layer is preferably determined so that it is balanced with the thickness of the substrate, the thickness of the pseudo-boehmite layer. However, it is usually preferably within a range of from 1 to 15 μm. Various conventional methods may be employed as a method for forming the polymer layer. It is preferred to employ a method wherein a polymer is coated on a substrate by means of a roll coater, an air knife coater, a blade coater, a rod coater or a bar coater, followed by drying.

In the present invention, it is preferred to provide a resin layer capable of absorbing a solvent in the ink, between the lower porous pseudo-boehmite layer and the substrate, since when recording is conducted by means of e.g. an ink jet printer, the solvent in the porous pseudo-boehmite layers can be absorbed also by the layer provided there beneath. Thus, the solvent remaining in the porous pseudo-boehmite layers can be reduced to the minimum level, whereby migration of the dye together with the diffusion of the remaining solvent will be controlled, and the dye will be fixed in a stable state as the time passes to provide a clear image without blotting.

The resin layer for absorbing the solvent in the ink is preferably the one which swells to absorb the solvent. The swelling degree by weight relative to the solvent (the ratio of the amount of water absorbed to the weight of the resin layer when the resin is immersed in a solvent at 30° C. for 48 hours) is preferably from 1.0 to 10, more preferably from 1.5 to 5. An excess swellability tends to adversely affect the operation for coating pseudo-boehmite layer. The higher the transparency of this layer, the better, since a clear recorded product is thereby obtained When the solvent of the ink is aqueous, polyvinyl alcohol or its modified product, starch or its modified product, gelatin, polyvinyl pyrrolidone or sodium polyacrylate may, for example, be preferably employed as such a resin.

The thickness of such a resin layer is preferably at a level of from 0.5 to 50 μm. If the thickness is less than 0.5 μm, no adequate effects of the resin layer tend to be obtained. On the other hand, if the thickness exceeds 50 μm, the layer tends to be opaque, whereby a clear image tends to be hardly obtained.

As a method for providing the resin layer capable of swelling with the solvent in the ink, on the substrate, it is possible to employ, for example, a method wherein the resin is dissolved in a suitable solvent, and the solution is coated by means of a bar coater, a reverse coater, a comma coater, a gravure coater or a dice coater, followed by removing the solvent. Otherwise, the resin may directly be synthesized by a chemical reaction on the substrate to form the layer.

Further, when the resin capable of absorbing the solvent in the ink contains inorganic fine particles, the inorganic fine particles form non-continuous portions in the resin layer, whereby the absorbing rate of the solvent to the resin can thereby be improved. It is preferred that the inorganic fine particles are porous themselves and thus have absorptivity, whereby the absorptivity of the resin layer is improved. However, the inorganic fine particles may not have such absorptivity by themselves.

The inorganic fine particles preferably have a particle diameter of at most 1 μm. If the particle diameter exceeds 1 μm, it tends to be difficult to coat the particles uniformly on the substrate, or in a case of a recording sheet where transparency is required as in the case of an OHP sheet, the transparency of the sheet tends to be impaired. A particle diameter of from 10 to 500 nm is more preferred. If the particle size is sufficiently smaller as compared with the wavelength of the visible light, the transparency is particularly excellent.

There is no particular restriction as to the material of the inorganic fine particles. However, inorganic oxide fine particles such as alumina or silica are preferred, since a product having a controlled particle size can readily be obtained. Specifically, it is preferred to employ fine particles of sol such as alumina sol or silica sol.

The content of the inorganic fine particles in the layer comprising the solvent-absorptive resin and the inorganic fine particles is preferably from 5 to 50% by weight. If the content is less than 5% by weight, no adequate effects of the inorganic fine particles will be obtained, and no improvement in the resolution of the recording sheet tends to be obtained. On the other hand, if the content exceeds 50% by weight, the effects for preventing blotting tend to be impaired.

Now, the present invention will be described in further detail with reference to Examples. However, it should be understood that the present invention is by no means restricted by such specific Examples.

EXAMPLE 1

Into a glass reactor having a capacity of 2,000 cc, 720 g of water and 676 g of isopropanol were charged and heated by a mantle heater to a liquid temperature of 75° C. While stirring the mixture, 306 g of aluminum isopropoxide was added, and the mixture was hydrolyzed for 5 hours while maintaining the liquid temperature to a level of from 75° to 78° C. Then, the temperature was raised to 95° C., and 9 g of acetic acid was added thereto. The mixture was maintained at a temperature of from 75° to 78° C. for 48 hours for deflocculation. This liquid was further concentrated to 900 g to obtain a white sol. The dried product of this sol was pseudo-boehmite.

To 5 parts by weight of this alumina sol, 1 part by weight of polyvinyl alcohol was added. Water was further added thereto to obtain a slurry having a solid content of 10% by weight. This slurry was coated on a polyethylene terephthalate film (thickness: 100 μm) treated by corona discharge treatment, by means of a bar coater, so that the dried thickness would be 20 μm, followed by drying.

Into a glass reactor having a capacity of 2,000 cc, 540 g of water and 676 g of isopropanol were charged and heated by a mantle heater to a liquid temperature of 75° C. While stirring the mixture, 306 g of aluminum isopropoxide was added, and the mixture was hydrolyzed for 5 hours while maintaining the liquid temperature to a level of from 75° to 78° C. Then, the temperature was raised to 95° C., and 9 g of acetic acid was added thereto. The mixture was maintained at a temperature of from 75° to 78° C. for 48 hours for deflocculation. This liquid was further concentrated to 900 g to obtain a white sol. The dried product of this sol was pseudo-boehmite.

To 5 parts by weight of this alumina sol, 1 part of polyvinyl alcohol was added. Water was further added thereto to obtain a slurry having a solid content of 10% by weight. This slurry was coated on the previous porous layer by means of a bar coater so that the dried thickness would be 10 μm, followed by drying.

Thus, a recording sheet having a pseudo-boehmite layer having an average pore radius of 50 Å formed in a thickness of 40 μm on the substrate and having a pseudo-boehmite layer having an average pore radius of 60 Å laminated in a thickness of 8 μm thereon, was obtained.

With respect to the above recording sheet, a solid printing test pattern was printed by means of an ink jet system copying machine (PIXEL Pro, manufactured by Canon Inc.). The printed portion was rubbed with a finger immediately after printing, whereby no ink attached to the finger. Further, a portion of the pattern where the amount of ink was large, was inspected, whereby no joining of dots, or no blotting or smear was observed.

EXAMPLE 2

In the same manner as in Example 1, two porous pseudo-boehmite layers were formed on one side of a polyethylene terephthalate film.

Then, a coating solution having a solid content of about 10% by weight, was prepared by mixing 7 parts by weight of polyvinyl alcohol and 3 parts by weight of polyvinyl pyrrolidone, followed by an addition of water. This coating soltion was coated on the side opposite to the side on which the pseudo-boehmite layers were formed, by means of a bar coater, so that the dried layer thickness would be 4 μm, followed by drying.

The recording sheet thus obtained, was put on an OHP projector which was switched on, whereby no warping of the sheet was observed.

The recording sheet for an ink jet printer of the present invention is capable of absorbing ink droplets immediately upon their contacts after ejection from a nozzle, whereby recording of a high quality free from deformation, blotting or smear of dots can be obtained. Further, this recording sheet has a high level of transparency and thus is suitable for use as an OHP sheet.

We claim:

1. A recording sheet for an ink jet printer, which comprises a substrate, a lower layer of porous pseudo-boehmite having an average pore radius of from 20 to 80 Å formed in a thickness of from 5 to 60 μm on the substrate and an upper layer of porous pseudo-boehmite having an average pore radius of from 40 to 150 Å formed in a thickness of from 2 to 30 μm on the lower layer, said lower and upper layers each further comprising about 5 to 50% by weight of binder based on the weight of the pseudo-boehmite, the average pore radius of the upper layer being larger than that of the lower layer.

2. The recording sheet for an ink jet printer according claim 1, wherein the lower layer of porous pseudo-boehmite has an average pore radius of from 40 to 60 Å and a thickness of from 30 to 50 μm, and the upper layer of porous pseudo-boehmite has an average pore radius of from 50 to 70 Å and a thickness of from 5 to 10 μm.

3. The recording sheet for an ink jet printer according to claim 1, wherein each of the upper and lower layers of porous pseudo-boehmite has a pore volume of from 0.3 to 1.0 cc/g.

4. The recording sheet for an ink jet printer according to claim 1, wherein the substrate is transparent.

5. The recording sheet for an ink jet printer according to claim 1, which has a swellable polymer layer formed on the side of the substrate opposite to the side on which the porous pseudo-boehmite layers are formed, said swellable polymer layer having a thickness of from about 1 to 15 μm.

6. The recording sheet for an ink jet printer according to claim 5, wherein the swellable polymer is a mixture of polyvinyl alcohol and polyvinyl pyrrolidone in a relative weight ratio of 4:6 to 9:1, respectively, and having a swelling degree by weight relative to the solvent of from 1.0 to 10.

7. The recording sheet for an ink jet printer according to claim 1, which has a solvent-absorbing resin layer between the substrate and the lower layer of porous pseudo-boehmite layer, said solvent-absorbing resin layer having a thickness of from about 0.5 to 50 μm.

8. The recording sheet for an ink jet printer according to claim 7, wherein the solvent-absorbing resin layer contains inorganic particles in an amount of about 5 to 50 by weight.

9. The recording sheet for an ink jet printer according to claim 4, wherein the substrate is a polyethylene terephthalate film.

* * * * *